United States Patent Office 3,356,824
Patented Dec. 5, 1967

3,356,824
ELECTRIC HEATING MEANS TO REMOVE AND PREVENT FORMATION OF FROST AND MIST ON VEHICLE WINDSCREENS
Lino Rossetti, Via Cesare Battisti 17, Viareggio, Lucca, Italy
Filed Feb. 3, 1965, Ser. No. 430,143
Claims priority, application Italy, Feb. 18, 1964, 3,723/64; Aug. 5, 1964, 18,426/64
4 Claims. (Cl. 219—203)

ABSTRACT OF THE DISCLOSURE

Means to prevent formation of and to remove frost and mist from an automobile windscreen. A rectangular sheet of transparent material is supported in spaced relation to the interior surface of the windscreen in a manner as to create a hermetically sealed hollow space between the windscreen and the sheet. The hollow space is crossed by a flow of hot air in a closed circuit; the air being heated by an electric heater and being kept in circulation within the hollow space by a motor driven fan. The fan and heater are supported in a container located adjacent to the hollow space and the container is provided with air inlet and outlet means connected to the lower corners of the hollow space by tubular means.

---

Figure 1:
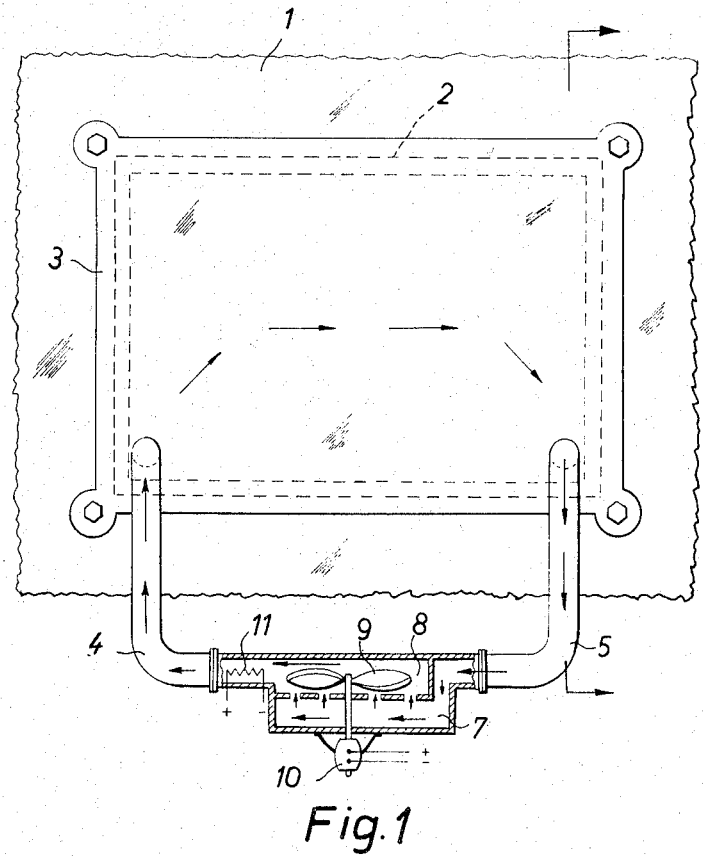

Motor vehicles in general, when they are subjected to low temperatures, are readily covered with hoar frost and ice crystals and suffer from internal misting in such a way that the driver is hampered in his use of the vehicle and has to attend to the removal, especially from the windscreen, of such internal misting, and to the clearing away, as well as he can, of hoar frost, that is to say ice crystals which form on the outside of the windscreen when the outside temperature is very low.

The present invention is designed to get rid of the above mentioned inconveniences and has as its object a useful and practical device which may be applied to the inside of the windscreen of motor vehicles in general to remove and prevent the formation of hoar frost and misting on the windscreen, essentially characterised by the fact that it creates a hermetically sealed hollow space between the outside surface of the windscreen and a sheet of transparent material, these being kept apart by means of a suitable seal around the edge and with the help of a number of suckers, the said hollow space being crossed by a flow of hot air in a closed circuit; the air being warmed by electrical resistances and kept in circulation within the hollow space by a fan operated by a small electric motor.

Other particulars and advantages of the invention will appear in the course of the following description which, together with the attached drawing which is presented as a schematic example and not as limiting the invention will readily make clear how the present invention can be put into practice, it being understood, of course, that both the particulars occuring in the text as well as those in the drawing form part of the invention.

Figure 2:
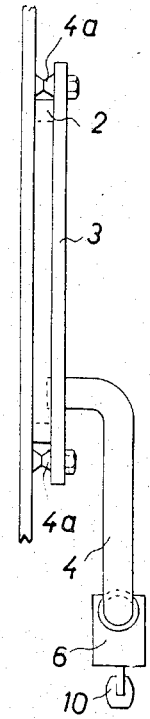

FIGS. 1 and 2 illustrate in front view, partially in section, and in side view respectively, one of the various forms which the device could take according to the invention. The fan is shown as being separate from the empty space but it is obvious that it could, with advantage, be fitted to the transparent sheet.

At 1 is shown a part of the windscreen of a vehicle (not illustrated), to which is applied, by means of a seal 2 around the edge, of a flexible material and of sufficient thickness, a sheet of transparent material 3 with the help of suckers 4a with the object of obtaining a firm hold at the edge and of creating a hollow air chamber between the windscreen 1 and the sheet 3.

To the lower part of the sheet 3 are fixed two tubular conductors 4 and 5 which communicate, on the one hand, with the hollow air chamber which lies between the windscreen 1 and the sheet 3 and, on the other hand, with a container 6 having two intercommunicating chambers one for the intake 7 and the other for the output 8 of air. The air is made to circulate in the above-mentioned hollow chamber, having been previously heated by the resistance 11, by the fan 9 operated by the small electric motor 10.

The air thus heated is set in continuous motion through the conductors 4 and 5 and circulates in a closed circuit; the said air, on being drawn back by the fan 9 is forced to pass over the resistance 11 and is then returned to the air chamber by the continuous action of the fan 9.

There are thus obtained two results which are essential to the purpose sought to be achieved: namely the creation of an appreciable difference in temperature between the outside atmosphere and the air inside the chamber since such air, although it loses its heat, is kept continuously at a high temperature and thus prevents the formation of layers of dampness or ice crystals on the outside surface of the windscreen; and a rapid and energetic cleaning of the inside surface due to the mechanical action of the turbulent movement of hot air which prevents the formation of condensation on the inside of the windscreen as a result of an accumulation of dampness inside the air chamber, especially when the apparatus has not been functioning for some time.

With the apparatus according to the invention one can keep the glass of the windscreen clean and clear under any kind of atmospheric conditions, and this certainly contributes effectively to the safe driving of the vehicle.

It is obvious that, to increase the efficiency of the device, the electrical resistances may be more than one in number; the same can be said of the suckers, of which there can be more than four so as to secure a more effective grip, and the fan-motor-resistance group can be placed in the air-chamber by inserting it between the windscreen and the sheet without, in this way, going outside the ambit of the invention.

What I claim is:

1. In a motor vehicle, a windscreen having an inner surface, a sheet of transparent material located adjacent and spaced from said inner surface of said windscreen, elongated, endless sealing means extending between and engaging said transparent sheet and said windscreen at the inner surface of the latter for defining with said windscreen and transparent sheet a hollow, hermetically sealed space, electrical heating means adjacent said space, rotary fan means for directing air past and into engagement with said electrical heating means to be heated thereby, said fan means having an air outlet and an air inlet, and air-conducting tubular means connecting said space with said fan means for providing in said space a continuous flow of heated air which uniformly heats said space, said space having a pair of opposed lower corners and said air-conducting tubular means having a pair of tubes respectively having open end situated at said lower corners and respectively passing through said transparent sheet and having said open ends located in said hollow space and directed toward said windscreen, one of said tubes having distant from said transparent sheet an end in communication with said air outlet of said fan means for directing heated air into said space to rise upwardly therein from the corner where said one tube is located and the other of said tubes having distant from said transparent sheet an end in communication with said outlet of said fan means for withdrawing air from said space at the other of said corners thereof to produce a downward flow of the air rising upwardly from said one tube and reflected in said space by said inner surface of said windscreen, to provide said uniform heating of said space.

2. In a motor vehicle, a windscreen having an inner surface, a sheet of transparent material located adjacent and spaced from said inner surface of said windscreen, elongated, endless sealing means extending between and engaging said transparent sheet and said windscreen at the inner surface of the latter for defining with said windscreen and transparent sheet a hollow, hermetically sealed space, electrical heating means adjacent said space, rotary fan means for directing air past and into engagement with said electrical heating means to be heated thereby, and air-conducting tubular means connecting said space with said fan means for providing in said space a continuous flow of heated air which uniformly heats said space, a container housing said rotary fan means and having a pair of chambers communicating with each other and in one of which said fan means together with said electrical heating means are located, said air-conducting tubular means including means for returning air from said space to the other of said chambers which thus receives heated air from said space, and said other chambers directing said heated air only axially to said rotary fan means, said electrical heating means being situated to receive only air which flows radially from said fan means.

3. The combination of claim 2 and wherein a motor is operatively connected to said rotary fan means to drive the latter, said motor being situated at the exterior of said container.

4. The combination of claim 1 and wherein a container houses said rotary fan means and has in its interior a pair of chambers one of which accommodates said rotary fan means and said electrical heating means with the latter situated to receive only air which flows radially from said rotary fan means, said one chamber having an outlet communicating with said one tube for directing the heated air to said one corner of said space, and said container communicating with the other of said tubes at said other chamber of said container for receiving air from said space, said container having in its interior a partition wall separating said chambers and located in a plane normal to the axis of rotation of said rotary fan means and behind and adjacent the latter, said wall being formed with openings through which air can flow to said fan means only in an axial direction so as then to be discharged therefrom radially toward said electrical heating means.

References Cited

UNITED STATES PATENTS

| | | | |
|---|---|---|---|
| 1,465,292 | 8/1923 | Wessig | 219—366 X |
| 1,814,034 | 7/1931 | Hartman | 219—203 |
| 1,960,696 | 5/1934 | Cawley | 52—171 |
| 2,304,691 | 12/1942 | Hund | 52—171 |
| 2,332,060 | 10/1943 | Colleran | 52—171 |

FOREIGN PATENTS 543,823    2/1932    Germany.

ANTHONY BARTIS, *Primary Examiner.*